Dec. 9, 1958 W. N. LARSON 2,863,670
RETRACTABLE SUPPORT FOR TRAILER DRAWBAR
Filed Aug. 16, 1957
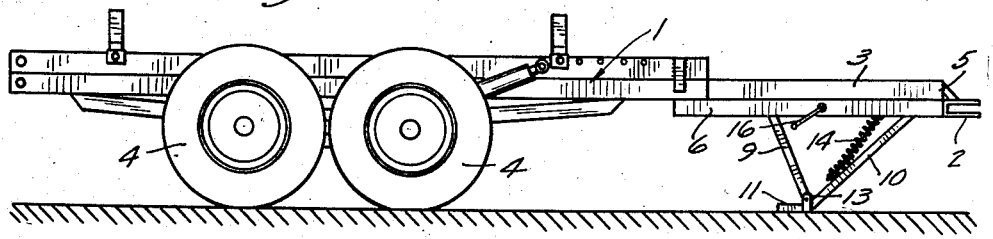
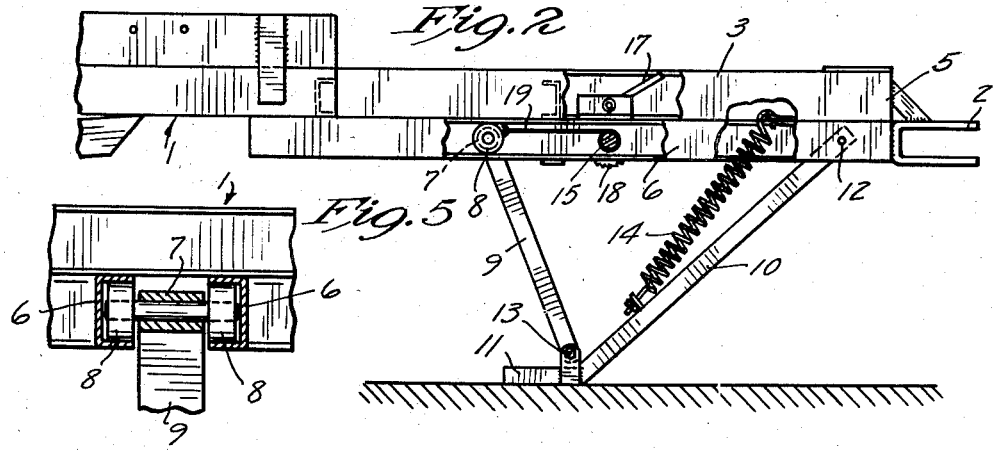
INVENTOR.
Walter N. Larson
BY
ATTORNEYS

United States Patent Office 2,863,670
Patented Dec. 9, 1958

2,863,670

RETRACTABLE SUPPORT FOR TRAILER DRAWBAR

Walter N. Larson, Grove City, Minn.

Application August 16, 1957, Serial No. 678,476

1 Claim. (Cl. 280—150.5)

My invention relates generally to trailers, and more particularly to tractor drawn trailers of the type which, when drawn by said tractors, rely for support of their drawbar-equipped forward ends upon said tractors. Such trailers, when detached from their tractors, obviously are incapable of supporting themselves in a generally horizontal load-carrying position, and consequently must rely upon independent front end supporting means for the purpose.

The primary object of my invention is the provision of novel retractable supporting mechanism for the drawbar-equipped forward ends of trailers of the class immediately above described.

A further object of my invention is the provision of a device of the class above described, which includes a skid-acting supporting leg which may be quickly and easily moved from a retracted position underlying the frame of the trailer to an extended operative position supporting the forward end of the trailer, with a minimum of skill and effort of the operator.

A further object of my invention is the provision of a device of the class above described which includes a pair of opposed guide rails rigidly secured to the frame of the trailer in laterally spaced generally parallel relation to each other and extending generally longitudinally of said trailer rearwardly of and in generally horizontal alignment of the hitching tongue thereof, a roller-equipped head carried by said rails and movable longitudinally thereof, an arm carried at its inner end by said head for swinging movements about an axis extending transversely of said rails, a skid-acting supporting leg having one end pivotally secured to said rails in forwardly spaced relation to said head on an axis parallel to the axis of swinging movement of said arm, said leg adjacent its skid-equipped free end being pivotally secured to the outer end of said arm, a coil spring yieldingly urging said leg toward a retracted position underlying the frame of said trailer, a winding drum journalled in and extending transversely of said rails intermediate said head and the pivotal connection of said leg to said rails, an elongated cable on said drum and connected to said head, rotation of said drum in one direction causing said leg to swing in a downward and forward trailer-supporting direction against the bias of said spring, and manually operated pawl and ratchet mechanism associated with said drum for releasably locking said drum against rotation in the opposite leg-retracting direction.

A still further object of my invention is the provision of a device of the class immediately above described which incorporates a minimum of working parts and which is rugged and durable.

The above and still further objects of my invention will become apparent from the following detailed specification, appended claims, and attached drawings.

Referring to the drawings wherein like characters indicate like parts throughout the several views:

Fig. 1 is a view in side elevation of a trailer equipped with my novel supporting mechanism;

Fig. 2 is an enlarged fragmentary view of the structure of Fig. 1, some parts being broken away and some parts shown in section;

Fig. 3 is a view corresponding to Fig. 2, but showing a different position of some of the parts thereof;

Fig. 4 is a view in top plan of the structure of Fig. 2;

Fig. 5 is an enlarged fragmentary sectional view taken substantially along the line 5—5 of Fig. 4; and Fig. 6 is an enlarged fragmentary view partly in section and partly in side elevation as seen substantially from the line 6—6 of Fig. 4.

Referring with greater particularity to the drawings, the numeral 1 indicates in its entirety the generally horizontally disposed frame work of a conventional trailer, the bifurcated drawbar 2 of which projects forwardly from the converging forward frame members 3. It will be observed that the wheels 4 are secured to the frame 1 rearwardly of its longitudinal center whereby the front end thereof, generally identified by the numeral 5, would normally drop down toward engagement with the ground, unless independently supported.

In accordance with my invention, a pair of cross-sectionally channel-shaped guide rails 6 are rigidly secured to the frame 1 of the trailer, preferably and as shown in underlying relation thereto, in laterally spaced generally parallel relationship to each other and extending longitudinally of the frame 1 immediately behind the drawbar 2 in general longitudinal alignment therewith.

A head 7, having rollers 8 on its opposite ends, one each receivable within one of the channel-shaped guide rails 6, is carried by said rails 6 and movable longitudinally thereof. An arm 9 has its inner end rigidly secured to the head 7 for swinging movements about an axis extending transversely of the rails 6. A supporting leg 10, preferably and as shown having a rearwardly projecting skid 11 at its free end, has its opposite end pivotally secured to the rails 6 in forwardly spaced relation to the head 7, as indicated by the numeral 12, on an axis parallel to the axis of swinging movement of the arm 9. It will be noted that the extended end of the arm 9 is pivotally secured to the extended end of the supporting leg 10, adjacent the skid 11, as indicated by the numeral 13.

A coil tension spring 14, interposed between the guide rails 6 and the projected skid-equipped end of the supporting leg 10, yieldingly urges said leg 10 toward the retracted full line position of Fig. 3 generally underlying the frame 1. A winding drum 15 having a handle 16 on one end and a pawl and ratchet mechanism 17, 18 at its opposite end, is journaled in the rails 6 and extends transversely thereof intermediate the head 7 and the pivotal connection 12 of the leg 10 to the rails 6. An elongated flexible member, preferably in the nature of a cable 19, is secured to the winding drum 15 and to the head 7, as indicated at 20.

From the above, it should be obvious that when it is desired to support the front end of the trailer 1, the supporting leg 10 is placed in its extended full line supporting position of Fig. 2 by rotating the winding drum 15 in a clockwise direction through the medium of the handle 16, against the bias of the coil spring 14. Upon engagement of the skid 11 with the ground, the pawl 17 is manually caused to engage one of the teeth of the ratchet 18, as shown in Fig. 6. The bias exerted by the coil spring 14 tending to return the supporting leg 10, the arm 9 and the head 7 to the position of Fig. 3, securely holds the ratchet 18 in tight engagement with the pawl 17 against accidental removal. Thereafter, the truck, not shown, may be separated from the trailer.

When it is desired to return the supporting leg 10, the arm 9 and the roller-equipped head 7 to the retracted position of Fig. 3, pursuant to the tractor again being attached to the drawbar 2, it is but necessary to swing the pawl 17 in a clockwise direction with reference to Fig. 6 so as to release said pawl 17 from operative engagement with the teeth of the ratchet 18. Note that movement of the roller-equipped head 7 to the position of Fig. 3 automatically imparts cable unwinding movements to the winding drum 15.

My invention has been thoroughly tested and found to be completely satisfactory for the accomplishment of the above objects, and while I have shown a preferred embodiment thereof, I wish it to be understood that same is capable of modification without departure from the scope and spirit of the appended claim.

What I claim is:

A pair of opposed cross-sectionally channel-shaped guide rails rigidly secured to the frame of a trailer in laterally spaced generally parallel relation to each other and extending generally longitudinally of said trailer rearwardly of and in general longitudinal alignment with the hitching tongue thereof, a roller-equipped head mounted on said rails and movable longitudinally thereof, an arm carried at its inner end by said head for swinging movements about an axis extending transversely of said rails, a supporting leg having one end pivotally secured intermediate said rails in forwardly spaced relation to said head and on an axis parallel to the axis of swinging movement of said arm for swinging movements from a depending operative position to a rearwardly and upwardly retracted inoperative position, said leg adjacent its free end being provided with a rearwardly projecting skid, means pivotally securing the outer end of said arm to said leg adjacent said skid, a winding drum journalled in and extending transversely of said rails intermediate said head and the pivotal connection of said leg to said rails, an elongated flexible cable on said drum connected to said head, a coil tension spring biasing said leg toward a retracted inoperative position, rotation of said drum in one direction causing said leg to swing downwardly and forwardly toward its extended supporting position against the bias of said spring, and manually operating pawl and ratchet mechanism associated with said drum for releasably locking said drum against rotation in the opposite leg-retracting direction.

References Cited in the file of this patent

UNITED STATES PATENTS

| 1,800,006 | Cadman | Apr. 7, 1931 |
| 1,915,142 | Winn | June 20, 1933 |
| 1,923,255 | Chambers | Aug. 22, 1933 |
| 2,225,157 | Court | Dec. 17, 1940 |

FOREIGN PATENTS

| 140,280 | Switzerland | Aug. 1, 1930 |